United States Patent [19]

Harris

[11] Patent Number: 4,643,353
[45] Date of Patent: Feb. 17, 1987

[54] AIR CONDITIONING CONTROL SYSTEM WITH ENHANCED OPERATING RANGE

[75] Inventor: William J. Harris, Tuhannock, Pa.

[73] Assignee: Anemostat Products Division, Dynamics Corp., Scranton, Pa.

[21] Appl. No.: 702,667

[22] Filed: Feb. 19, 1985

[51] Int. Cl.<sup>4</sup> .............................................. F23N 5/20
[52] U.S. Cl. ................................... 236/49; 137/486
[58] Field of Search ................... 236/49; 137/486, 489

[56] References Cited

U.S. PATENT DOCUMENTS

| | | | |
|---|---|---|---|
| 1,538,427 | 5/1925 | Earl | 137/486 X |
| 3,171,432 | 3/1965 | Bard | 137/486 X |
| 4,042,173 | 8/1977 | Boyer et al. | 236/49 |
| 4,120,453 | 10/1978 | Herb et al. | 137/486 X |
| 4,364,409 | 12/1982 | Jones | 137/486 |
| 4,413,648 | 11/1983 | Walters et al. | 137/486 |

*Primary Examiner*—William E. Wayner
*Attorney, Agent, or Firm*—McCormick, Paulding & Huber

[57] ABSTRACT

A control for an air conditioning system comprises a flow sensor and a condition sensor in the form of a thermostat controlling a pivotal lever which in turn sets a pressure at a control orifice for an actuator which operates the control damper in an air supply duct. The flow signal is obtained by upstream and downstream pressure taps adjacent an orifice in the duct and the temperature signal is obtained in a conventional manner and applied to the pivotally supported control lever via a diaphragm, push rod, reset spring, etc. In order to enhance the operating range of the control a variable area orifice means is provided and may comprise a pair of swingable vanes adjacent the fixed orifice and the upstream and downstream pressure taps. The vanes may be moved to open and closed positions, modulated therebetween and they may be under the control of an on-off manual valve or alternatively they may respond to the second condition or temperature sensor.

12 Claims, 3 Drawing Figures

AIR CONDITIONING CONTROL SYSTEM WITH ENHANCED OPERATING RANGE

BACKGROUND OF THE INVENTION

Conventional controllers in air conditioning systems may be of the general type shown in U.S. Pat. No. 3,809,314 entitled SELF-POWERED VARIABLE VOLUME AIR DAMPER CONTROL, U.S. Pat. No. 4,077,567 entitled PNEUMATIC TEMPERATURE RESET DIFFERENTIAL PRESSURE CONTROLLER, and U.S. Pat. No. 4,042,173 entitled METHOD AND APPARATUS FOR CONTROLLING VOLUME AIR FLOW.

Generally, controllers of the type under consideration are of the pneumatic type and employ duct or independent supply air in the control and operation of a pneumatic actuator which positions a flow regulating damper in response to the demands of the controller. A differential pressure across a fixed orifice is conventionally employed to provide a flow responsive signal representing the flow of conditioned air in the duct section associated with the damper. The differential pressure is applied across a diaphragm for operating a push rod or like output member in a pneumatic-mechanical motion transducer. The push rod is operatively associated with a pivotally supported lever which is also influenced by one or more reference or bias signals provided, for example, by adjustable minimum and maximum flow stops and by a signal responsive to a conditioned affecting a controlled space which receives the conditioned air. That is, the second signal may also be pneumatic and may comprise a temperature signal taken from a pneumatic thermostat in a controlled space which receives conditioned air from the duct and damper associated with the control system. When temperature control or temperature reset as it is commonly referred to is introduced, a pneumatic thermostat is usually employed with a pneumatic-mechanical motion transducer having a push rod or other output member acting in opposition to a bias or reset spring. The temperature or other air condition signal is combined with the aforesaid flow responsive and reference or bias signals to provide a composite signal acting on the aforesaid pivotally supported lever in opposition to the push rod or other output member of the flow or differential pressure transducer. The temperature or other air condition control or reset signal may be transmitted to the pivotally supported lever by a second pivotally supported lever.

The various signals acting on the first mentioned pivotally supported lever of the control system result in a composite signal at a control orifice which may comprise a flow responsive signal compared against a temperature reset signal. The control orifice establishes a pneumatic actuator operating pressure for movement and control of the damper in the conditioned air duct and for the maintainence of desired flow or volume conditions in the duct and for reset operation in accordance with the temperature or other air condition signal.

Control systems of the type described operate relatively efficiently over a somewhat limited operating range and are generally satisfactory except in those applications where an expanded operating range is required.

It is the general object of the present invention to provide an improved air conditioning control system of the general type employing a flow responsive signal and a second signal responsive to a condition affecting a controlled space receiving conditioned air, the system including a means for varying the area of the normally fixed flow orifice in the supply duct and for thus enhancing the effective operating range of the control system.

SUMMARY OF THE INVENTION

In accordance with the present invention and in fulfillment of the aforementioned object, a control for an air conditioning system is provided and has at least one duct for supplying conditioned air to a controlled space. A damper is provided in the duct for regulating the flow of conditioned air through the duct to the controlled space and an actuator operatively associated with the damper positions the same in the duct. Means in the duct defines a flow orifice and a first sensor is operatively associated with the orifice and produces a signal responsive to air flow through the orifice. A second sensor responsive to a condition affecting the control space is transmitted to a means for combining the flow responsive signal together with the condition responsive signal. The said combining means transmits a resultant or composite signal to the actuator which operates the damper.

In accordance with the invention, a means for varying the area of the flow orifice in the duct is also provided and serves to enhance the effective operating range of the control.

The condition sensor is in certain conventional systems a sensor for an air temperature condition and may comprise a pneumatic thermostat in the controlled space.

Both the flow responsive and temperature responsive signals are preferably pneumatic in nature and the signal combining and transmitting means includes pneumatic-mechanical-pneumatic tranducer means. Thus, the resultant or composite signal provided by such means is pneumatic in nature with the actuator for the damper also being pneumatically operable.

The flow sensor preferably includes first and second pressure taps in the conditioned air duct respectively disposed on upstream and downstream sides of the aforementioned flow orifice and the flow signal is thus in the form of a differential pressure signal.

The means for varying the area of the orifice in the duct may be manually operable and may provide for at least two discrete orifice areas. Further, said orifice varying means may be operatively associated with and operable by the second sensor responsive to the condition which effects the controlled space.

The form of the means for varying the orifice area may vary widely but preferably includes at least one movable element adjacent the orifice and an actuator operatively connected with the movable element.

A pair of swingable vanes controlled by an actuator and operable to vary orifice area are presently preferred.

PREFERRED EMBODIMENTS OF THE INVENTION

Figure 1:
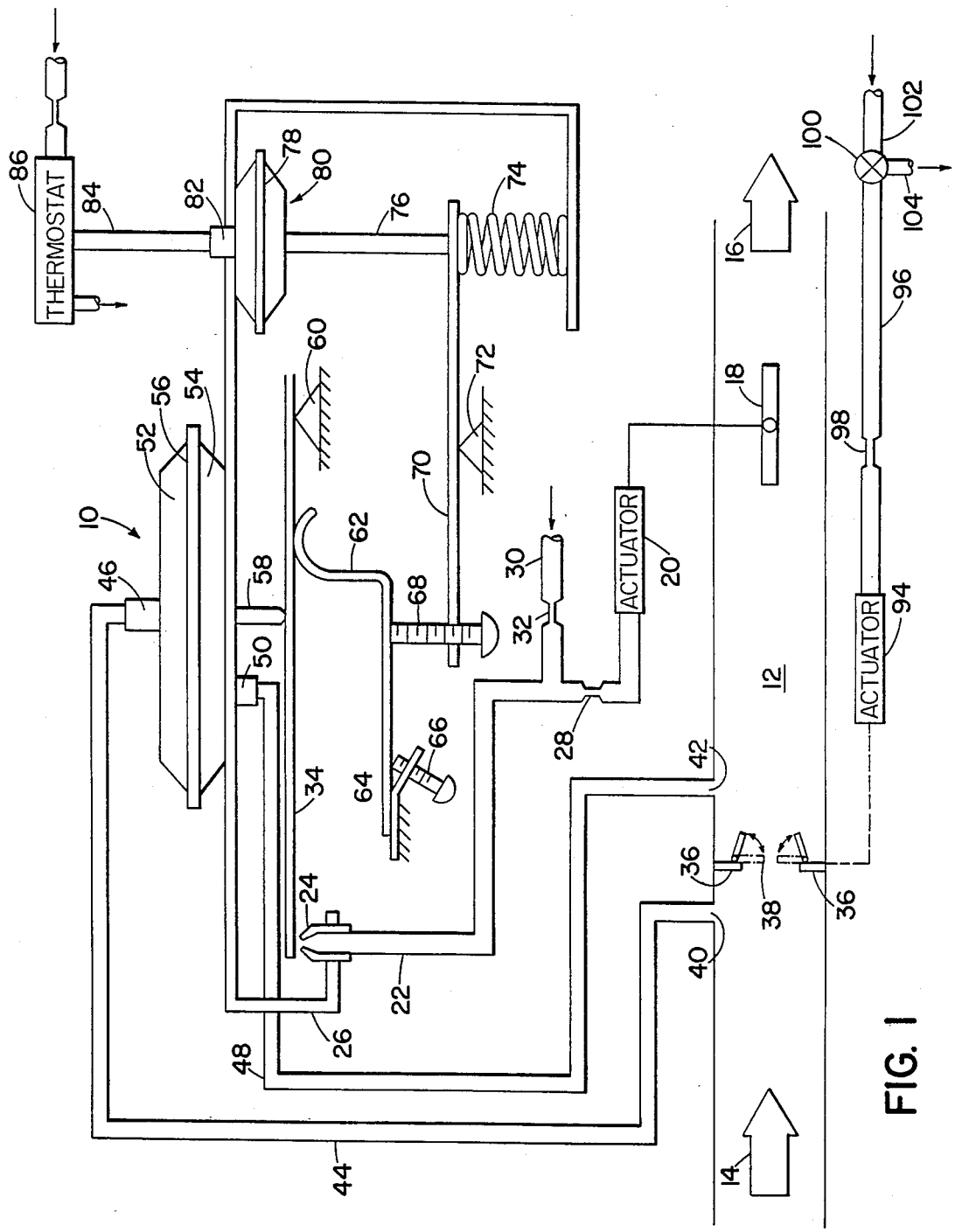
FIG. 1 of the drawings is a schematic illustration showing the improved air conditioning control system of the present invention.

Referring particularly to FIG. 1, an improved air conditioning control system is illustrated generally at 10 and includes a conditioned air supply duct 12 with conditioned air flowing therethrough from left to right as indicated by the arrows 14, 16. Disposed in the duct 12 is a damper 18 which may vary widely in form and which is operated by an actuator 20 which is preferably of the pneumatic type. The actuator 20 is controlled in its operation by a pneumatic control line 22 extending from a control orifice 24 supported by a frame member 26. The control line 22 includes a restriction 28 and communicates with a branch conduit 30 which may receive a supply of control air from an independent source of supply or in some instances from the conduit 12 in a self-contained system. Restriction 32 is provided in supply line 30. As will be apparent, the position of a pivotally supported lever 34 relative to the control orifice 24 will determine the pressure in the line 22 thereby serving to operate the actuator 20 and the damper 18 in the supply duct 12.

The supply duct 12 may discharge air to a room or other enclosure which will be hereafter referred to as a controlled space. That is, the controlled space will be that entity which is supplied with conditioned air from the duct 12.

As is conventional in control systems of the type under consideration, a fixed orifice is provided in the supply duct 12 and is defined by an orifice defining means 36. The orifice at 38 receives a left to right flow of conditioned air and creates a pressure differential thereacross sensed at pressure taps 40, 42 respectively on the upstream and downstream sides of the orifice. Pressure tap 40 communicates with control conduit 44 leading to tap 46 and the tap 42 communicates with a control conduit 48 which leads to a tap 50. The taps 46, 50 enter chambers 52, 54 respectively on opposite sides of a diaphragm 56 in a diaphragm assembly which includes an output element in the form of a push rod 58.

As will be apparent, the upstream and downstream or high and low pressures operating on opposite sides of diaphragm 56 result in a conversion to a mechanical motion at the push rod 58. Thus, the diaphragm assembly takes the form of a pressure-mechanical motion transducer and the push rod 58 operates on the aforementioned pivotally supported lever 34. The lever 34 is supported at 60 and the force exerted by the push rod 58 is opposed by a leaf spring 62. Spring 62 is fixedly supported at its left hand end portion 64 and is acted upon by a minimum flow adjusting bolt 66 and a maximum flow adjusting bolt 68. The maximum flow adjusting bolt 68 also serves to transmit a second signal to the pivotally supported lever 34 via the lever 62. That is, a second pivotally supported lever 70 operatively associated with bolt 68 is pivotally supported at 72 and at its right hand end portion, has a biasing or reset spring 74 acting upwardly thereon and a push rod 76 acting downwardly thereon.

The push rod 76 is associated with a diaphragm 78 in a diaphragm assembly 80. The diaphragm assembly 80 includes a tap 82 which receives a pneumatic signal through a signal line 84 from a second sensor which may take the form of a pneumatic thermostat 86 as illustrated.

As thus far described, the control system is substantially conventional and operates to maintain a flow or volume condition responsive to the first sensor comprising the taps 40, 42 the control lines 40, 48, etc. That is, flow through the duct 12 will be maintained at a constant level absent any change in the signal from the second sensor and irrespective of changes in supply pressure, etc. When the temperature signal from the second sensor or thermostat 86 calls for a reset of the flow condition through the duct 12, the control system operates accordingly and thereafter maintains the flow or volume constant at the newly established level pending a further change in the signal from the second sensor or thermostat.

Figure 2:
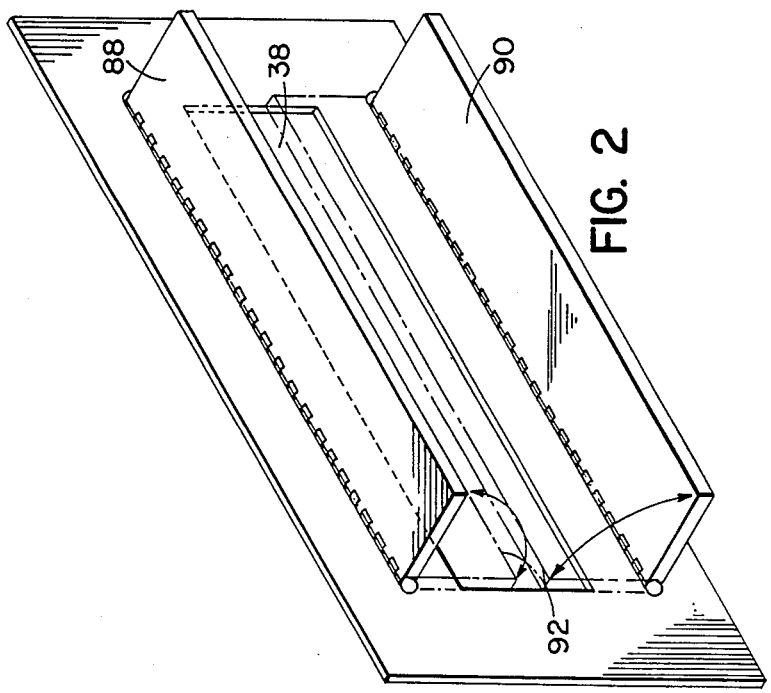
FIG. 2 is a somewhat schematic perspective view showing a preferred form of orifice varying means of the present invention.

In accordance with the present invention, a means for varying the area of the orifice 38 is included in the control system and may take the form illustrated in FIG. 2. That is, when a square or rectangular duct is provided the orifice 38 in FIG. 2 may be provided with upper and lower movable elements or vanes 88, 90 for operation in unison from the position shown wherein the vanes may be regarded as being open with a full exposure of the orifice 38 to a closed position. The closed position of the vanes 88, 90 is illustrated by the broken lines 92 and it will be apparent that the exposed area of the orifice 38 is substantially reduced with the vanes 88 and 90 respectively swung downwardly and upwardly to their closed positions.

Any suitable mechanism may be provided for swinging the vanes 88, 90 between their open and closed positions and to intermediate positions therebetween by means of an actuator 94, FIG. 1. The actuator 94 may be of the pneumatic type and operated under the control of a conduit 96 which includes a restriction 98 and which may include a manually operable valve 100, FIG. 1. The manually operable valve 100 has associated supply and discharge conduits 102, 104 and it will be apparent that the actuator 94 may be selectively pressurized by connecting the conduit 102 therewith and vented to atmosphere by connecting the conduit 104 therewith.

As an illustrative example, assume a fixed orifice 38 having an area of one square foot. The following conditions may then be found typical:

| VELOCITY | CFM | TURN DOWN RATIO | VELOCITY PRESSURE (INCHES H20) |
| --- | --- | --- | --- |
| 4,000 fpm | 4,000 | — | 1.0 |
| 2,000 fpm | 2,000 | 2–1 | 0.25 |
| 1,000 fpm | 1,000 | 4–1 | 0.065 |
| 800 fpm | 800 | 5–1 | 0.04 |

As will be apparent, the range of operation of the control system or "turndown ratio" is 5 to 1 with a fixed orifice of one square foot. Consider now the results with a substantially reduced orifice area. That is, assume that the orifice area 38 in FIG. 2 is approximately one square foot and that the vanes 88 and 90 when moved to their closed positions, reduce the orifice area to approximately two inches by twelve inches or twenty-four square inches.

| ORIFICE AREA | VELOCITY | CFM | TURN DOWN RATIO | VELOCITY PRESSURE (INCHES H20) |
| --- | --- | --- | --- | --- |
| 1 sq. ft. | 4,000 fpm | 4,000 | — | 1.0 |

-continued

| ORIFICE AREA | VELOCITY | CFM | TURN DOWN RATIO | VELOCITY PRESSURE (INCHES H20) |
|---|---|---|---|---|
| 0.166 sq. ft. | 800 fpm | 133 | 30-1 | 0.04 |

As will be apparent, a substantially enhanced operating range or turn down ratio of 30 to 1 is acheived with the reduction in area of the orifice 38.

Figure 3:
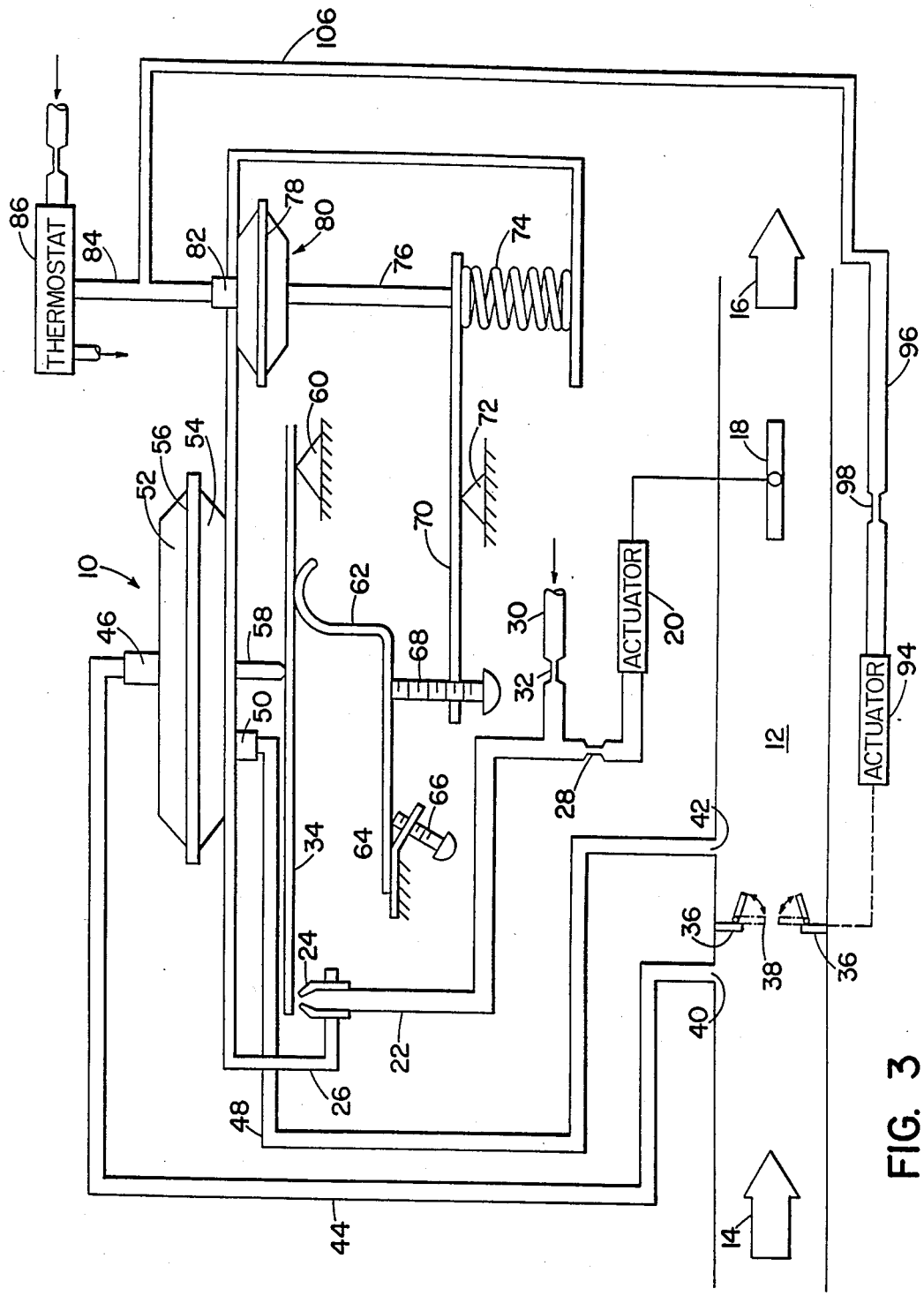
FIG. 3 is a schematic illustration showing a further embodiment of the air conditioning control system of the present invention.

In a second embodiment of the present invention, the second operating signal, or the temperature signal in the embodiment of FIG. 3 may be employed to operate the orifice varying means of the present invention. That is, a line 106 shown in FIG. 3 may be provided from the thermostat 86 to the line 96 with the valve 100 and the branch line 104 deleted. Thus, the actuator 94 will operate under the influence of thermostat 86 and may be operated to provide a two position or a modulating operation of the orifice varying means comprising the vanes 88, 90.

From the foregoing, it will be apparent that the operating range of a conventional air conditioning control system can be substantially enhanced with the inclusion of a variable area orifice means as disclosed. It will also be apparent that the variable area orifice can be provided in any duct configuration including square, rectangular, circular, etc. Further, it should be noted that the area of the orifice can be varied in order to provide a wide variety of control functions including variation of the orifice area in parallel or inversely with the temperature reset operation of the control system, in sequence with the temperature reset control function, in a stepped manner from a maximum area to a minimum area, etc., to obtain desired control functions.

I claim:

1. In a control for an air conditioning system having at least one duct for supplying conditioned air to a controlled space, the combination comprising a damper for regulating the flow of conditioned air through said duct to said space, an actuator operatively associated with said damper for positioning the same in said duct, means defining a flow orifice in said duct, a first sensor operatively associated with said orifice and producing a signal responsive to air flow through said duct and orifice, a second sensor responsive to a condition affecting said controlled space, means for combining said flow responsive signal and said condition responsive signal and for transmitting a resultant signal to said actuator for operation thereof and for corresponding movement of said damper in reponse thereto, and means for varying the area of said flow orifice in said duct whereby to enhance the effective operating range of the control said means for varying the area of said orifice being operatively associated with and operable by said second sensor responsive to a condition affecting said controlled space.

2. The combination in an air conditioning control as set forth in claim 1 wherein said condition sensor is operable in response to an air temperature condition.

3. The combination in an air conditioning control as set forth in claim 2 wherein said flow and temperature signals are pneumatic, wherein said signal combining and transmitting means includes pneumatic-mechanical-pneumatic transducer means, and wherein said resultant signal is pneumatic and said actuator is pneumatically operable.

4. The combination in an air conditioning control as set forth in claim 3 wherein said first sensor includes first and second pressure taps in said duct respectively on upstream and downstream sides of said flow orifice, said flow responsive signal thus taking the form of a differential pressure signal.

5. The combination in an air conditioning control as set forth in claim 1 wherein said means for varying the area of said orifice is manually operable and provides for two discrete orifice areas.

6. The combination in an air conditioning control as set forth in claim 1 wherein said means for varying said orifice area includes at least one movable element adjacent said orifice and an actuator operatively connected therewith.

7. The combination in an air conditioning control as set forth in claim 8 wherein said actuator is pneumatically operable and connected with and operable by said second sensor.

8. The combination in an air conditioning control as set forth in claim 1 wherein said orifice varying means comprises a pair of swingable vanes controlled by said actuator and operable to vary orifice area by at least one-half.

9. The combination in an air conditioning control as set forth in claim 1 wherein said flow and temperature signals are pneumatic, wherein said signal combining and transmitting means includes pneumatic-mechanical-pneumatic transducer means, and wherein said resultant signal is pneumatic and said actuator is pneumatically operable.

10. The combination in an air conditioning control as set forth in claim 1 wherein said first sensor includes first and second pressure taps in said duct respectively on upstream and downstream sides of said flow orifice, said flow responsive signal thus taking the form of a differential pressure signal.

11. The combination in an air conditioning control as set forth in claim 1 wherein said actuator is pneumatically operable and connected with and operable by said second sensor.

12. In a control for an air conditioning system having at least one duct for supplying air to a controlled space, the combination comprising a damper for regulating the flow of conditioned air through said duct to said space, an actuator operatively associated with said damper for positioning the same in said duct, means defining a flow orifice in said duct, a first sensor operatively associated with said orifice and producing a signal responsive to air flow through said duct and orifice, a second sensor responsive to a condition affecting said controlled space, means for combining said flow responsive signal and said condition responsive signal and for transmitting a resultant signal to said actuator for operation thereof and for corresponding movement of said damper in response thereto, and means for varying the area of said flow orifice in said duct whereby to enhance the effective operating range of the control, said means for varying said orifice area including a pair of swingable vanes and an actuator operatively connected therewith to vary the orifice area by at least one-half.

* * * * *